Oct. 4, 1932. P. A. WILLIAMS 1,880,623
BROACHING TOOL
Filed March 15, 1930
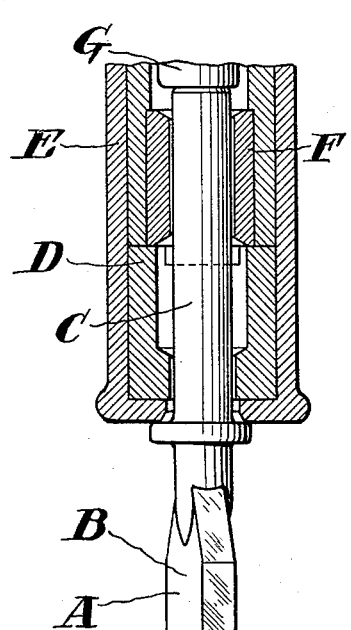
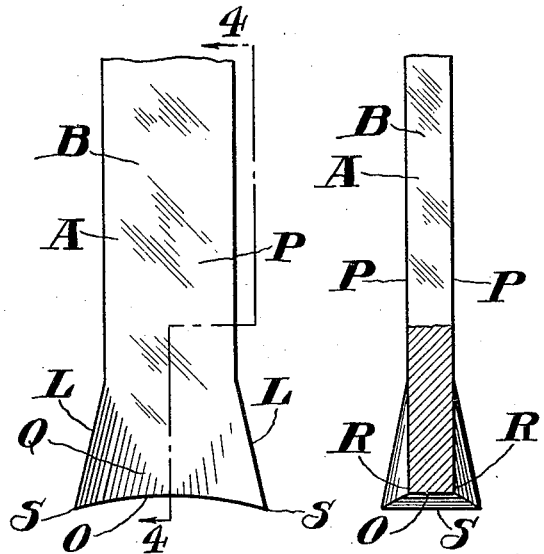
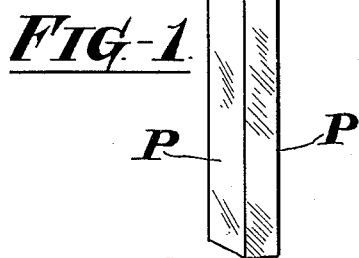
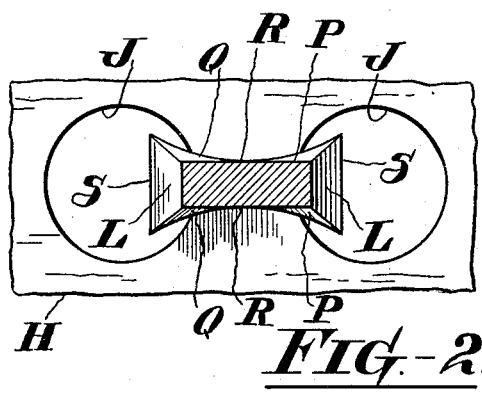
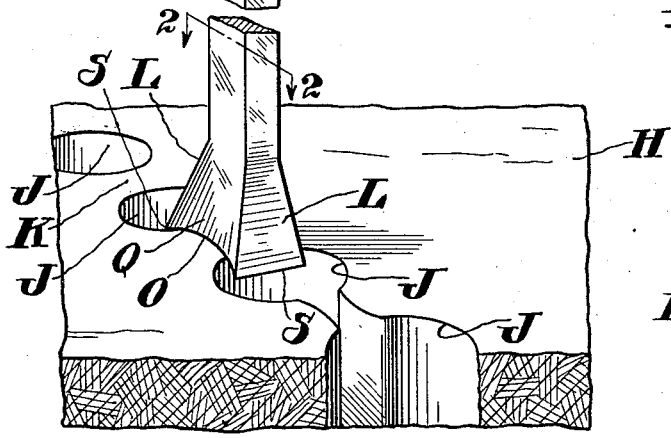
INVENTOR.
Peter A. Williams.
BY
HIS ATTORNEY.

Patented Oct. 4, 1932

1,880,623

UNITED STATES PATENT OFFICE

PETER A. WILLIAMS, OF WHITE PLAINS, NEW YORK, ASSIGNOR TO INGERSOLL-RAND COMPANY, OF JERSEY CITY, NEW JERSEY, A CORPORATION OF NEW JERSEY

BROACHING TOOL

Application filed March 15, 1930. Serial No. 436,083.

This invention relates to broaching tools, but more particularly to broaching tools adapted to be actuated by fluid actuated rock drills for severing blocks of rock from the mass.

Usually in such quarrying operations it is the common practice to drill a series of holes in line. The holes are so spaced with respect to each other that only a narrow wall of rock remains therebetween and the walls thus formed between the drill holes are afterwards cut away or reduced by means of a broaching tool.

Various types of broaching tools have been devised for performing this work, as for instance, those having flat rectangular body portions, which have been found to be preferable because of their rigidity and strength, particularly in deep-cut work.

The broaching tool may be provided with any suitable type of shank to extend into the chuck or guiding mechanism of a rock drill. As is well known, it is customary to so proportion the shank and the guiding or chuck mechanism of the rock drill that the broaching tool may reciprocate freely with respect to the rock drill. This being the case it is of course difficult to entirely prevent deflection of the broaching tool with respect to the drill whereby it is actuated. This is particularly the case when making vertical cuts in which the broaching tool occupies a horizontal position. The reason for this is that the cutting bit of the broaching tool constantly tends to deflect downwardly and, owing to the loose fit of the tool shank in the rock drill, it is extremely difficult to maintain the cutting bit even approximately in line with the longitudinal axis of the drill.

In efforts to prevent deflection of the broaching tool, separate guiding means adapted to be inserted in the drill hole have been employed to form a guiding surface for the broaching tool. Such guiding means have however, proven unsatisfactory for well known reasons. Of these, one is that the diameter of the drill hole changes with each change of drill steel and therefore at intervals of approximately every two feet.

Where deep holes are being drilled, as for instance, thirty feet in depth, the diameter at the entrance of the hole may be as much as two inches greater than that at the bottom of the hole. Obviously, the wall intervening between the bottoms of adjacent holes is increased by that distance. Due to this fact any guiding means inserted in a drill hole for the broaching tool may not readily occupy a position in which it lies parallel to the longitudinal axis of the drilling apparatus. The tendency therefore is to constantly crowd the broaching tool from the desired coarse.

It is an object of the present invention to so construct the broaching tool that the cutting bit thereof will constantly tend to maintain the broaching tool in the desired and in the most suitable position on the intervening wall of rock between two drill holes.

Other objects will be in part obvious and in part pointed out hereinafter.

In the accompanying drawing illustrating the invention and in which similar reference characters refer to similar parts, Figure 1 is a perspective view of a broaching tool constructed in accordance with the practice of the invention, Figure 2 is a plan view taken through Figure 1 on the line 2—2 looking in the direction indicated by the arrows, Figure 3 is a side elevation of a cutting bit of the broaching tool, and Figure 4 is an elevation partly in section taken through Figure 3 on the line 4—4 looking in the direction indicated by the arrows.

Referring more particularly to the drawing, A designates a broaching tool comprising a body portion B having in this instance a cylindrical shank C which extends into the chuck D of a rock drill E whereby it is guided.

The shank C may, as illustrated, be of such length that it will extend through the chuck D and a chuck bushing F into the path of a reciprocatory hammer piston G whereby the blows of impact are delivered to the broaching tool for actuating it into the work, such as the rock H.

In the rock H are a series of drill holes J which, as will be observed, are drilled in line and are so spaced with respect to each other that there only remains a narrow wall of rock K between adjacent drill holes.

The body portion B of the broaching tool A preferably consists of a flat rectangular bar having an up-set portion at its front end to form a cutting bit L. The cutting bit L is preferably flared outwardly from the sides and edges of the body portion B so that the front end thereof is of somewhat greater width and depth than the width and depth of the body portion B of the broaching tool, and in the front end of the cutting bit is formed a concavity O which assists in maintaining the cutting bit on the intervening wall of rock K during the broaching operation.

Additional means are provided, however, to further assure against the cutting bit creeping from the desired course, as for instance, from the narrower portion of the wall K of rock and at which point it is desirable to form the broaching cut since in that way only a minimum amount of rock need be removed. To this end the cutting bit L is provided on the opposite sides P, which are the sides of greater width, with depressions Q preferably of concave form to form an intermediate narrow portion R at the front end of the cutting bit L and said depressions Q extend from one edge of the cutting bit to the other edge. Preferably the thickness of the intermediate narrow portion R is approximately equal to the thickness of the body portion B of the broaching tool. By providing the cutting bit with the concave depressions there are formed outer wide or flared portions S on the cutting bit which will tend to hold the cutting bit substantially against lateral movement during its operation.

As will be readily seen from the foregoing description, when the cutting bit L is being driven into the wall K of the rock H the cut formed thereby will have convex sides so that when the cutting bit tends to move laterally, that is, in the direction of the flared portions S the concave surfaces of the depressions Q will be engaged by the wall of the cut in the rock and the cutting bit L will thus be prevented from deflecting to a degree in which the side edges are flared portions S will be withdrawn wholly from one or the other of the drill holes. In consequence, the cutting bit will tend to remain in the position in which it will completely span the wall of the rock K between the adjacent walls. This is particularly desirable when making vertical cuts in which the broaching tool lies in a horizontal position. The broaching tool will then be held in substantial alignment with the actuating mechanism by the concave surfaces of the depressions Q which will engage the rock being cut.

I claim:

A broaching tool, comprising a body portion of rectangular cross section having a cutting bit formed at its lower end, said bit being bounded by two outwardly flared flat end surfaces and by two concave side surfaces, the concave surfaces at their centers being tangent respective to the side faces of the body portion and a cylindrical lower surface extending from end to end of the bit and forming two cutting edges where the lower surface intersects the side surfaces.

In testimony whereof I have signed this specification.

PETER A. WILLIAMS.